(12) United States Patent
Sohani et al.

(10) Patent No.: US 11,233,402 B2
(45) Date of Patent: Jan. 25, 2022

(54) SYSTEM AND METHOD FOR STABILIZING WEAK GRIDS WITH ONE OR MORE WIND FARMS CONNECTED THERETO

(71) Applicant: General Electric Company, Schenectady, NY (US)

(72) Inventors: Apoorva Anil Sohani, Hubli (IN); Karthikeyan Appuraj, Hyderabad (IN); Deepak Raj Sagi, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/734,914

(22) Filed: Jan. 6, 2020

(65) Prior Publication Data

US 2021/0210959 A1 Jul. 8, 2021

(51) Int. Cl.
*H02J 3/38* (2006.01)
*F03D 7/04* (2006.01)
*F03D 9/25* (2016.01)
*G06N 20/00* (2019.01)

(52) U.S. Cl.
CPC .............. *H02J 3/381* (2013.01); *F03D 7/048* (2013.01); *F03D 9/257* (2017.02); *G06N 20/00* (2019.01); *H02J 2203/20* (2020.01); *H02J 2300/28* (2020.01)

(58) Field of Classification Search
CPC .... H02J 3/381; H02J 2203/20; H02J 2300/28; G06N 20/00; F03D 7/048
See application file for complete search history.

(56) References Cited

U.S. PATENT DOCUMENTS

| | | | |
|---|---|---|---|
| 8,041,465 B2 | 10/2011 | Larsen et al. |
| 9,190,845 B2 | 11/2015 | Nelson et al. |
| 9,541,062 B2 | 1/2017 | Yin et al. |
| 9,831,810 B2 | 11/2017 | Achilles et al. |
| 9,920,746 B2 | 3/2018 | Diedrichs et al. |
| 10,072,634 B2 | 9/2018 | Busker |

(Continued)

FOREIGN PATENT DOCUMENTS

| | | |
|---|---|---|
| CN | 108879705 A | 11/2018 |
| KR | 101850663 B1 | 4/2018 |
| WO | WO 201811531 A1 | 6/2018 |

OTHER PUBLICATIONS

European Search Report for EP Application No. 20216151.9 dated Jun. 8, 2021.

(Continued)

*Primary Examiner* — Joseph Ortega
(74) *Attorney, Agent, or Firm* — Dority & Manning, P.A.

(57) ABSTRACT

A method for controlling a wind farm electrical power system is presented. The wind farm electrical power system includes a controller and a plurality of wind turbines electrically connected to an electrical grid through a point of interconnection. Each wind turbine includes a voltage regulator. The method includes receiving, via the controller, one or more electrical signals associated with the point of interconnection for a frequency domain. Further, the method includes estimating, via an estimator of the controller, a voltage sensitivity of the electrical grid using the one or more electrical signals. Moreover, the method includes dynamically controlling a voltage of the wind farm electrical power system at the point of interconnection based on the voltage sensitivity.

17 Claims, 8 Drawing Sheets

(56) References Cited

U.S. PATENT DOCUMENTS

| | | | |
|---|---|---|---|
| 10,333,308 B2 | 6/2019 | Guo et al. | |
| 2010/0025994 A1 | 2/2010 | Cardinal et al. | |
| 2015/0088326 A1* | 3/2015 | Fortmann | F03D 7/048 |
| | | | 700/287 |
| 2016/0111883 A1 | 4/2016 | Beekmann et al. | |
| 2016/0237990 A1* | 8/2016 | Ubben | F03D 7/048 |
| 2017/0338652 A1* | 11/2017 | Ubben | H02J 3/383 |
| 2018/0223807 A1* | 8/2018 | Badrinath Krishna | |
| | | | F03D 7/047 |

OTHER PUBLICATIONS

Al-Iedani, Intessar et al., Order reduction of a wind turbine energy system via the methods of system balancing and singular perturbations, International Journal of Electrical Power & Energy Systems, vol. 117, Jordan Hill, Oxford GB, Nov. 5, 2019.

Li, Peng et al., Determination of Local Voltage Control Strategy of Distributed Generators in Active Distribution Networks Based on Kriging Metamodel, IEEE Access, vol. 7, Apr. 1, 2019, p. 34438-34450.

Yadykin, Igor B. et al., Characterization of power systems near their stability boundary using the sub-Gramian method, Control Engineering Practice, vol. 53, Pergamon Press, Oxford, GB, Oct. 23, 2015, p. 173-183.

\* cited by examiner

SYSTEM AND METHOD FOR STABILIZING WEAK GRIDS WITH ONE OR MORE WIND FARMS CONNECTED THERETO

FIELD

The present disclosure relates generally to systems and methods for controlling wind farms having one or more wind turbines, and more particularly, to systems and methods for stabilizing weak grids with one or more wind farms connected thereto.

BACKGROUND

Wind power is considered one of the cleanest, most environmentally friendly energy sources presently available, and wind turbines have gained increased attention in this regard. Existing electrical power distribution systems (e.g., electrical grids) can be utilized for distributing power from renewable energy sources, such as wind, if control systems and methodologies are utilized to coordinate the power produced by the renewable energy sources, the power demand on the power distribution systems and the power consumed based on the varying operational states that are inherent with respect to renewable energy sources. For example, the operational state of a wind turbine can vary based on wind speeds or the absence of wind.

Wind power does not always have a constant power output, but can include variations; therefore, operators of power distribution systems have to take this into account. One of the consequences is, for example, that the distribution and transmission networks have become more difficult to manage. This pertains also to the management of resonance in a power distribution system, including wind turbines. Like conventional power plants, wind power plants or wind farms should be managed or controlled to provide electrical grids with power that is stable (e.g., with constant voltage and frequency, minimum disturbances, and low harmonics emission) to ensure reliability and proper delivery of power.

With respect to renewable energy plants, such as wind farms, connection of these renewable energy plants to the grid can include long high voltage transmission lines due to the remote locations in which these plants can be located. Transmission lines (i.e., power cables) and additional electrical infrastructure (e.g., transformers, reactors, capacitors) can result in resonance at low frequencies (e.g., below second or third harmonics). In addition, due to the remote or harsh conditions where many wind farms are located, wind farms are often integrated with weak grids that can be negatively impacted by resonance, thereby causing an overloaded circuit at the point of interconnection (POI). As such, oscillations can occur in the phase POI voltage.

In such cases, the grid authority requires wind farm operators to curtail the power being supplied to the grid to ensure a suitable short circuit ratio (SCR). Although this action ensures grid stability, it also means an annual energy production (AEP) loss for the wind farm. Moreover, integrating inverter-based resources, such as wind farms, into weak grids can present many challenges, such as creating the potential for a resonance condition in the system, that can be mitigated by different methods including reinforcements of the transmission lines or integrating additional equipment into the grid to improve strength. These methods of grid reinforcement include disadvantages, including additional space requirements, multiple control locations and settings, increased system component costs, increased system installation costs and increased system maintenance costs.

In view of the foregoing, systems and methods for stabilizing weak grids where one or more wind farms are connected thereto without negatively impacting AEP would be welcomed in the art. As such, the present disclosure is directed to dynamically stabilizing the electrical grid using frequency domain and machine learning.

BRIEF DESCRIPTION

Aspects and advantages of the invention will be set forth in part in the following description, or may be obvious from the description, or may be learned through practice of example embodiments of the present disclosure.

In an aspect, the present disclosure is directed to a method for controlling a wind farm electrical power system. The wind farm electrical power system includes a controller and a plurality of wind turbines electrically connected to an electrical grid through a point of interconnection. Each wind turbine includes a voltage regulator. The method includes receiving, via the controller, one or more electrical signals associated with the point of interconnection for a frequency domain. Further, the method includes estimating, via an estimator of the controller, a voltage sensitivity of the electrical grid using the one or more electrical signals. Moreover, the method includes dynamically controlling a voltage of the wind farm electrical power system at the point of interconnection based on the voltage sensitivity.

In an embodiment, the electrical signal(s) may include any one of or a combination of the following: phase voltage, phase current, active power, and/or reactive power at the point of interconnection.

In another embodiment, the method may include measuring the electrical signal(s) via at least one sensor or determining the electrical signal(s) via a computer-implemented model of the controller.

In further embodiments, the method may include processing the electrical signal(s) associated with the point of interconnection prior to estimating the voltage sensitivity. For example, in an embodiment, processing the electrical signal(s) may include filtering, sorting, or similar or combinations thereof.

In additional embodiments, estimating the voltage sensitivity of the electrical grid using the electrical signal(s) may include, for example, modeling, via the controller, the electrical grid as a linear time-invariant system for the frequency domain, monitoring the frequency domain for perturbations, determining whether the perturbations correspond to the wind farm electrical power system or to neighboring wind farm electrical power systems, and removing perturbations corresponding to neighboring wind farm electrical power systems so as to decouple an effect of the perturbations on the voltage sensitivity.

More specifically, in an embodiment, determining whether the perturbations correspond to the wind farm electrical power system or to neighboring wind farm electrical power systems may include grouping perturbations of at least one of the active power or the reactive power with the phase voltage for the frequency domain and removing perturbations not in groups.

In an embodiment, dynamically controlling the voltage of the wind farm electrical power system based on the voltage sensitivity may include varying at least one parameter of one or more of the voltage regulators to avoid instability of the electrical grid. In particular embodiments, the parameter(s) may include, for example, a regulator gain, an active power set point, a reactive power set point, or combinations thereof, as well as any other suitable parameter.

In several embodiments, the method may include processing, via a post processor of the controller, the electrical signal(s) associated with the point of interconnection after dynamically controlling the voltage of the wind farm electrical power system based on the voltage sensitivity to determine an error analysis of the parameter(s) of the voltage regulator.

In further embodiments, the method may also include receiving, via a machine learning algorithm of the controller, feedback from the post processor and training the feedback via the machine learning algorithm. In such embodiments, the method may include generating one or more control commands for the estimator of the controller using outputs of the machine learning algorithm to continually update the estimator.

In certain embodiments, the machine learning algorithm may include a trained neural network, a simple linear regression model, a random forest regression model, or a support vector machine. More specifically, in an embodiment, the method may include embedding a reinforcement learning technique in the machine learning algorithm.

In certain embodiments, a response time of the estimator may be faster than the controller and a response time of the controller may be faster than generation of the control command(s) from the machine learning algorithm.

In another aspect, the present disclosure is directed to a system for controlling a wind farm electrical power system. The wind farm electrical power system includes a plurality of wind turbines electrically connected to an electrical grid through a point of interconnection. Each wind turbine includes a voltage regulator. The system includes a controller having a plurality of processors including, at least, an estimator. The estimator is configured to perform operations, including, for example, receiving one or more electrical signals associated with the point of interconnection for a frequency domain and estimating a voltage sensitivity of the electrical grid using the one or more electrical signals. As such, the controller is configured to dynamically control a voltage of the wind farm electrical power system at the point of interconnection based on the voltage sensitivity by varying at least one parameter of one or more of the voltage regulators to avoid instability of the electrical grid. It should be understood that the system may further include any of the additional features described herein.

Variations and modifications can be made to these example aspects of the present disclosure. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
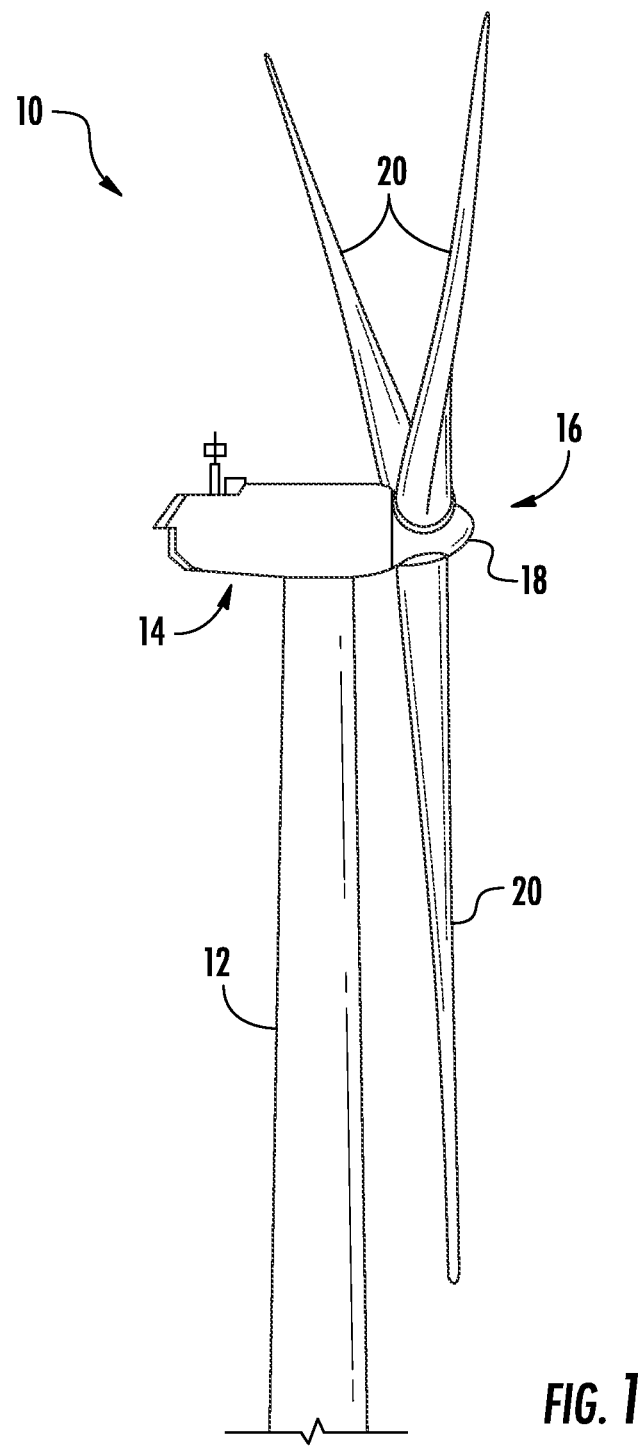
FIG. 1 illustrates a perspective view of a portion of a wind turbine according to example embodiments of the present disclosure.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Referring now to the figures, FIG. 1 depicts a perspective view of one embodiment of a wind turbine 10 according to the present disclosure. As shown, the wind turbine 10 generally includes a tower 12 extending from a support surface (not shown), a nacelle 14 mounted on the tower 12, and a rotor 16 coupled to the nacelle 14. The rotor 16 includes a rotatable hub 18 and at least one rotor blade 20 coupled to and extending outwardly from the hub 18. For example, in the illustrated embodiment, the rotor 16 includes three rotor blades 20. However, in an alternative embodiment, the rotor 16 may include more or less than three rotor blades 20. Each rotor blade 20 may be spaced about the hub 18 to facilitate rotating the rotor 16 to enable kinetic energy to be transferred from the wind into usable mechanical energy, and subsequently, electrical energy. For instance, the hub 18 may be rotatably coupled to an electric generator 28 (FIG. 2) positioned within the nacelle 14 to permit electrical energy to be produced.

Figure 2:
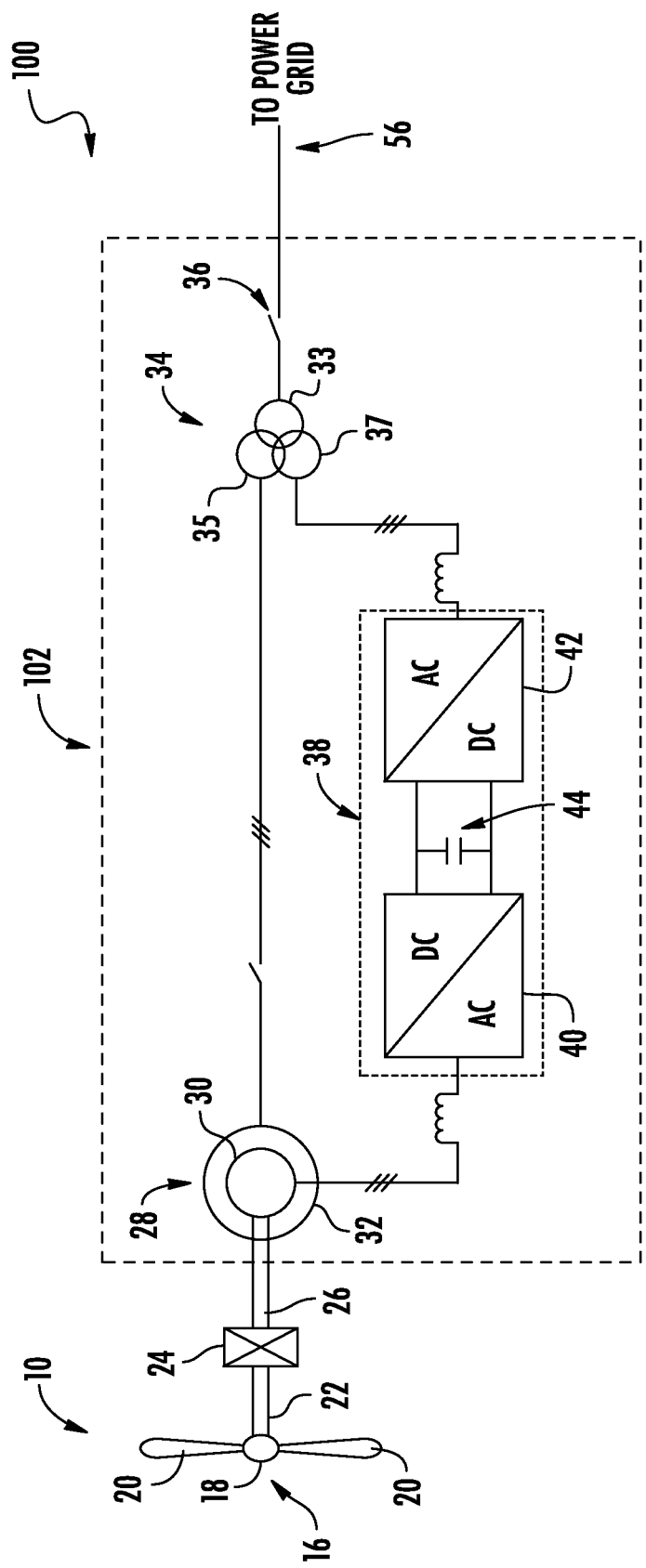
FIG. 2 illustrates a schematic diagram of a wind turbine electrical power system according to example embodiments of the present disclosure which is suitable for use with the wind turbine shown in FIG. 1.

Referring now to FIG. 2, a wind turbine power system 100, which includes the wind turbine 10 and associated power system 102, is illustrated. As wind impacts the rotor blades 20, the blades 20 transform wind energy into a mechanical rotational torque that rotatably drives a low-speed shaft 22. The low-speed shaft 22 is configured to drive a gearbox 24 (where present) that subsequently steps up the low rotational speed of the low-speed shaft 22 to drive a high-speed shaft 26 at an increased rotational speed. The high-speed shaft 26 is generally rotatably coupled to a generator 28 (such as a doubly-fed induction generator or DFIG) so as to rotatably drive a generator rotor 30. As such, a rotating magnetic field may be induced by the generator rotor 30 and a voltage may be induced within a generator stator 32 that is magnetically coupled to the generator rotor 30. The associated electrical power can be transmitted from the generator stator 32 to a main three-winding transformer 34 that is connected to an electrical grid at a POI 56 via a grid breaker 36. Thus, the main transformer 34 steps up the voltage amplitude of the electrical power such that the transformed electrical power may be further transmitted to the electrical grid.

In addition, as shown, the generator 28 may be electrically coupled to a bi-directional power converter 38 that includes a rotor-side converter 40 joined to a line-side converter 42 via a regulated DC link 44. The rotor-side converter 40 converts the AC power provided from the generator rotor 30 into DC power and provides the DC power to the DC link 44. The line side converter 42 converts the DC power on the DC link 44 into AC output power suitable for the electrical grid. Thus, the AC power from the power converter 38 can be combined with the power from the generator stator 32 to provide multi-phase power (e.g. three-phase power) having a frequency maintained substantially at the frequency of the electrical grid (e.g. 50 Hz/60 Hz).

Figure 3:
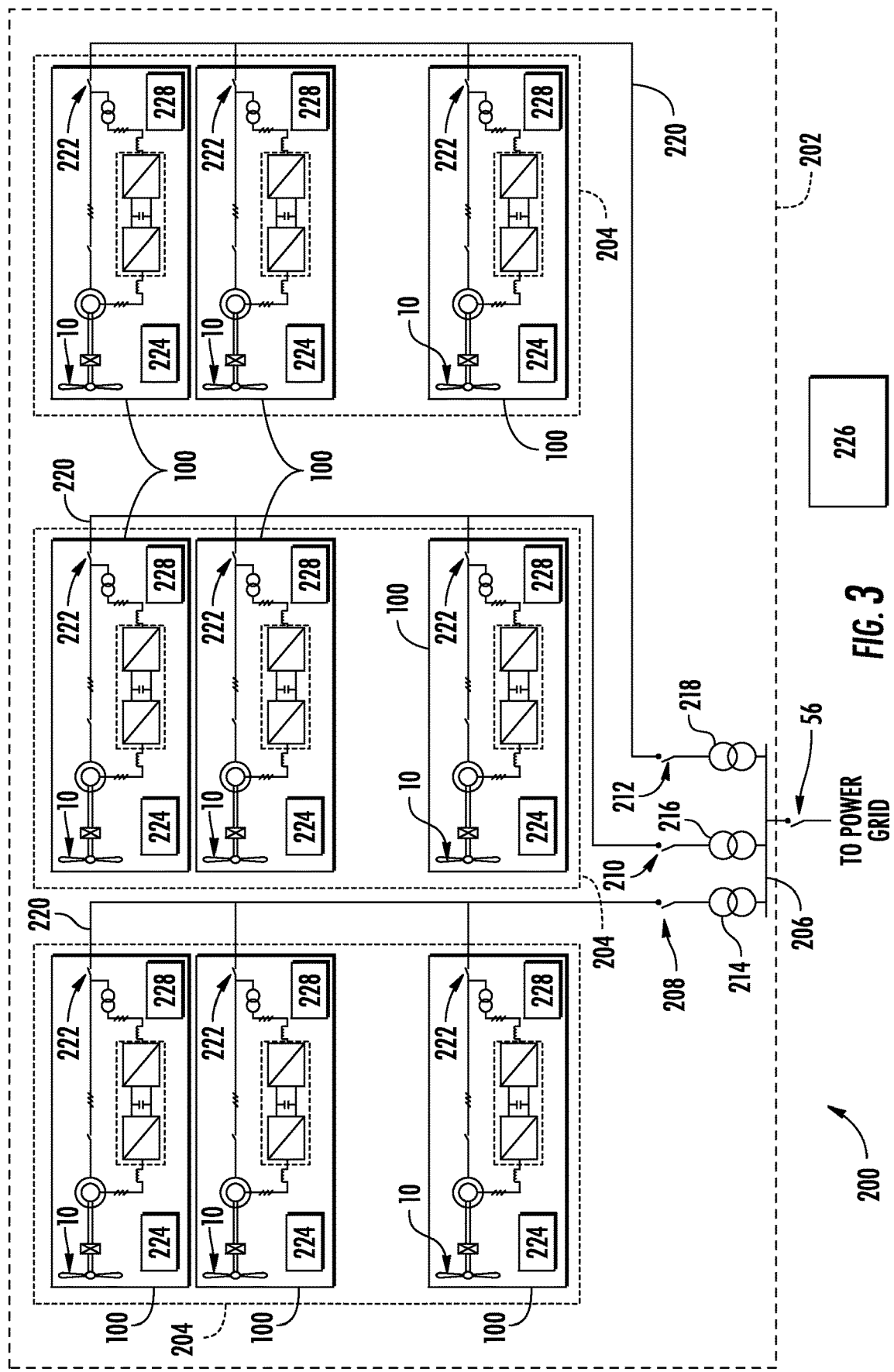
FIG. 3 illustrates a schematic diagram of a wind farm electrical power system according to example embodiments of the present disclosure.

In some configurations power system 102 can include a turbine level controller 224 (shown in FIG. 3). The turbine level controller 224 can be a control, such as the controller shown and described in FIG. 4.

The illustrated three-winding transformer 34 can have (1) a 33 kilovolt (kV) medium voltage (MV) primary winding 33 connected to the electrical grid, (2) a 6 to 13.8 kV MV secondary winding 35 connected to the generator stator 32, and (3) a 690 to 900 volt (V) low-voltage (LV) tertiary winding 37 connected to the line-side power converter 42.

Referring particularly to FIG. 3, a schematic diagram of one embodiment of a wind farm electrical power system 200 according to example embodiments of the present disclosure is illustrated. More specifically, as shown, the wind farm electrical power system 200 can include a plurality of wind turbine power systems 100, connected to an electrical grid via a POI 56. The wind farm electrical power system 200 may include at least two clusters 204 to form an electrical power system 200. Individual wind turbine power systems 100 including of a plurality of wind turbines 10 may be arranged in predetermined geographic locations and electrically connected together to form a wind farm 202.

The electrical power associated with each wind turbine power system 100 can be transmitted to a main line 206 via one or more cluster lines 220. Each wind turbine power system 100 can be connected or disconnected to the one or more cluster lines 220 via one or more switches or breakers 222. Wind turbine power systems 100 may be arranged into a plurality of groups (or clusters) 204 with each group separately connected to a main line 206 via switches 208, 210, 212, respectively. Thus, as shown, each cluster 204 may be connected to a separate transformer 214, 216, 218 via switches 208, 210, 212, respectively, for stepping up the voltage amplitude of the electrical power from each cluster 204 such that the transformed electrical power may be further transmitted to the electrical grid. In addition, as shown, the transformers 214, 216, 218 are connected to a main line 206 that combines the voltage from each cluster 204 before sending the power to the grid via a POI 56. The POI 56 can be a breaker, switch or other known method of connection to an electrical grid.

Each wind turbine power system 100 can include a voltage regulator 228 (i.e., a wind turbine terminal voltage regulator). As such, the voltage regulator 228 regulates the voltage which is output by each wind turbine power system 100. Further, the voltage regulator 228 can be in electrical communication with turbine controller 224 or central master controller 226. Thus, the turbine-level controller 224 or central master controller 226 can deliver a voltage regulator gain command ($V_{CMD}$) to one or more of the voltage regulators 228 which in turn dictates the amount of power distributed to the POI 56 via cluster lines 220.

Each wind turbine power system 100 can include one or more controllers, such as turbine controller 224. The turbine controller 224 can be configured to control the components of the wind turbine power system 100, including switches 222 or voltage regulator 228, and/or implement some or all the method steps as described herein. The turbine controller 224 can be located on or within each wind turbine 10 or can be located remotely from each wind turbine 10. The turbine controller 224 can be part of or included with one or more of the other controllers associated with wind turbine power system 100 and/or the wind farm electrical power system 200. The turbine controller 224 can operate switches 222 to connect or disconnect the one or more wind turbine power systems 100 from the cluster lines 220 and control the voltage regulator 228, such as the voltage regulator gain, based at least in part on the power required at the POI 56, and/or based, at least in part, on characteristics of the wind turbine power system 100, wind farm electrical power system 200, and/or characteristics of the wind turbines 10 (e.g., wind turbine size, location, age, maintenance status), the electrical grid (e.g., strength or condition of the grid, strength or condition of the connection of the wind farm or wind turbine to the grid, grid architecture, grid location), the load on the grid (e.g., loads that are heavy or variable) and/or the environmental conditions (e.g., the wind conditions for the one or more wind turbines).

The wind farm electrical power system 200 can include one or more controllers, such as central master controller 226. The central master controller 226 can be configured to control the components of the wind farm electrical power system 200, including switches 208, 210 and 212, voltage regulators 228, communicate with one or more other controllers, such as turbine-level controllers 224, and/or implement some or all the method steps as described herein. The central master controller 226 can be located within the geographic area of the wind farm electrical power system 200, or any portion thereof, or can be located remotely from the wind farm electrical power system 200, or any portion thereof. The central master controller 226 can be part of or included with one or more of the other controllers associated with one or more of the wind turbine power systems 100 and/or the wind farm electrical power system 200. Each of the clusters 204, wind turbine power systems 100, or turbine-level controllers 224, may be communicatively coupled with a Central master controller 226.

The central master controller 226 can generate and send control signals to turbine controller 224 to operate switches 222 to connect or disconnect the one or more wind turbine power systems 100 from the cluster lines 220 based at least in part on the power required at the POI 56. The central master controller 226 can generate and send control signals to voltage regulators 228 to operate or control the voltage regulators 228 and control the amount of power delivered to the POI from the one or more wind turbine power systems 100 through the cluster lines 220 based at least in part on the power required at the POI 56. The central master controller 226 can generate and send control signals to switches 208, 210 and/or 212 and/or voltage regulators 228 to regulate the power delivered to the POI 56, based at least in part on the power required at the POI 56, and/or based, at least in part, on characteristics of the wind turbine power system 100, wind farm electrical power system 200, and/or characteristics of the wind turbines 10 (e.g., wind turbine size, location, age, maintenance status), the electrical grid (e.g., strength or condition of the grid, strength or condition of the connection of the wind farm or wind turbine to the grid, grid architecture, grid location), the load on the grid (e.g., loads that are heavy or variable) and/or the environmental conditions (e.g., the wind conditions for the one or more wind turbines).

Figure 4:
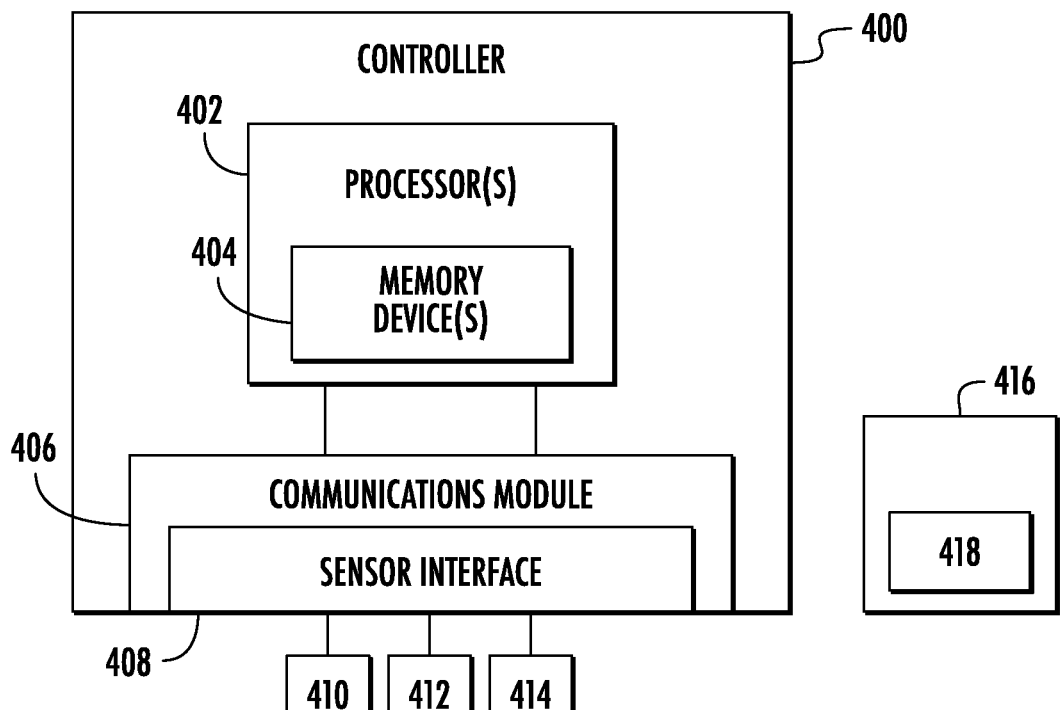
FIG. 4 illustrates a block diagram of a controller according to example embodiments of the present disclosure.

Referring now to FIG. 4, a block diagram of a controller 400 according to example embodiments of the present disclosure is illustrated. As shown, the controller 400 can be a turbine-level controller 224 or central master controller 226. Further, as shown, the controller 400 can include one or more processor(s) 402 and associated memory device(s) 404 configured to perform a variety of computer-implemented functions (e.g., performing the methods, steps, calculations and the like and storing relevant data as disclosed herein). The memory device 404 may also store date relevant to certain characteristics of the wind turbine power system 100, wind farm electrical power system 200, and/or characteristics of the wind turbines 10 (e.g., wind turbine size, location, age, maintenance status), the electrical grid (e.g., strength or condition of the grid, strength or condition of the connection of the wind farm or wind turbine to the grid, grid architecture, grid location), the load on the grid (e.g., loads that are heavy or variable) and/or the environmental conditions (e.g., the wind conditions for the one or more wind turbines).

Additionally, the controller 400 may include a communications module 406 to facilitate communications between the controller and the various components of the wind turbine power system 100, the wind farm electrical power system 200 and/or the central master controller 226, including communication between central master controller 226 and turbine-level controller 224. Further, the communications module 406 may include a sensor interface 408 (e.g., one or more analog-to-digital converters) to permit signals transmitted from one or more sensors 410, 412 and 414 to be converted into signals that can be understood and processed by the processors 402. Sensors 410, 412 and 414 can be used to measure, ascertain or gather data regarding characteristics of the wind turbine power system 100, wind farm electrical power system 200, and/or characteristics of the wind turbines 10 (e.g., wind turbine size, location, age, maintenance status), the electrical grid (e.g., strength or condition of the grid, strength or condition of the connection of the wind farm or wind turbine to the grid, grid architecture, grid location), the load on the grid (e.g., loads that are heavy or variable) and/or the environmental conditions (e.g., the wind conditions for the one or more wind turbines).

Still referring to FIG. 4, the controller 400 can also include a user interface 416. The user interface 416 can have various configurations and controls can be mounted or in user interface 416. The user interface 416 can also be located within the geographic area of the wind farm electrical power system 200, or any portion thereof, or can be located remotely from the wind farm electrical power system 200, or any portion thereof. The user interface 416 can include an input component 418. Input component 418 can be, for instance, a capacitive touch screen. The input component 418 can allow for the selective activation, adjustment or control of wind farm controller 226 and turbine controller 224, as well as any timer features or other user adjustable inputs. One or more of a variety of electrical, mechanical or electro-mechanical input devices, including rotary dials, push buttons, and touch pads, can also be used singularly or in combination as input component 418. The user interface 416 can include a display component, such as a digital or analog display device designed to provide operation feedback to a user.

It should be appreciated that the sensors 410, 412 and 414 may be communicatively coupled to the communications module 406 using any suitable means. For example, the sensors 410, 412 and 414 may be coupled to the sensor interface 408 via a wired connection. However, in other embodiments, the sensors 410, 412 and 414 may be coupled to the sensor interface 408 via a wireless connection, such as by using any suitable wireless communications protocol known in the art. As such, the processor 402 may be configured to receive one or more signals from the sensors 410, 412 and 414. Sensors 410, 412 and 414 can be part of or included with one or more of the other controllers associated with one or more of the wind turbine power systems 100 and/or the wind farm electrical power system 200. Sensors 410, 412 and 414 can also be located within the geographic area of the wind farm electrical power system 200, or any portion thereof, or can be located remotely from the wind farm electrical power system 200, or any portion thereof.

It should also be understood that sensors 410, 412 and 414 can be any number or type of voltage and/or electric current sensors may be employed within the wind turbine power systems 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art. Thus, the one or more controllers, such as wind farm controller 226 and turbine controller 224, are configured to receive one or more voltage and/or electric current feedback signals from sensors 410, 412 and 414.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 402 is also configured to compute advanced control algorithms and communicate to a variety of Ethernet or serial-based protocols (Modbus, OPC, CAN, etc.). Additionally, the memory device(s) 404 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 140 may generally be configured to store suitable computer-readable instructions that, when implemented by the processor(s) 402, configure the controller to perform the various functions as described herein.

Figure 5:
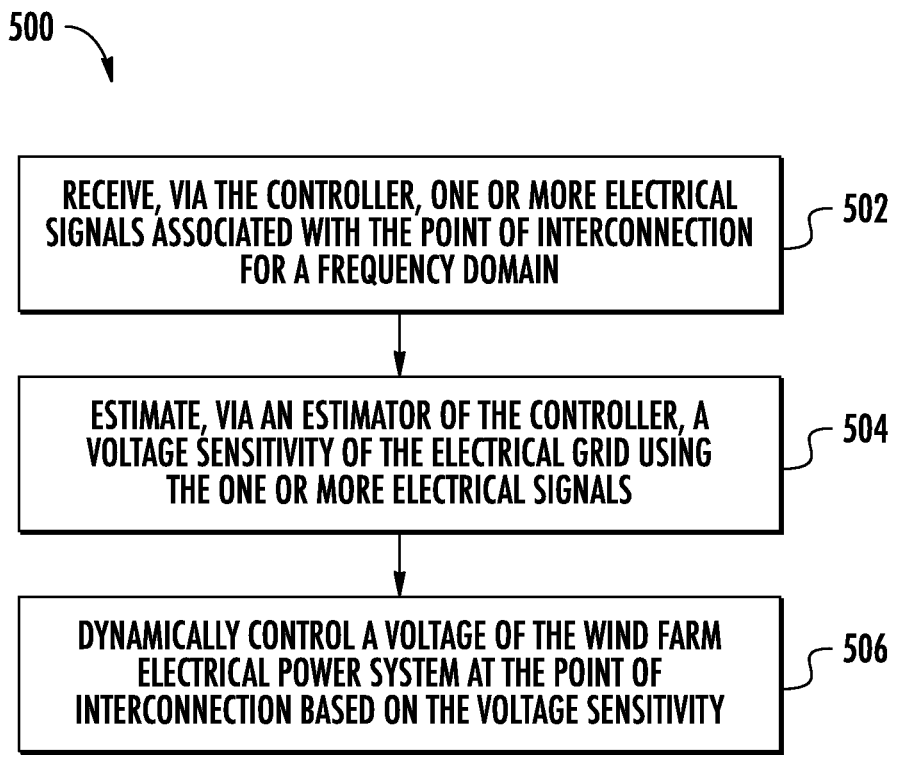
FIG. 5 illustrates a flow diagram of one embodiment of a method for controlling a wind farm electrical power system of the present disclosure.
Figure 6:
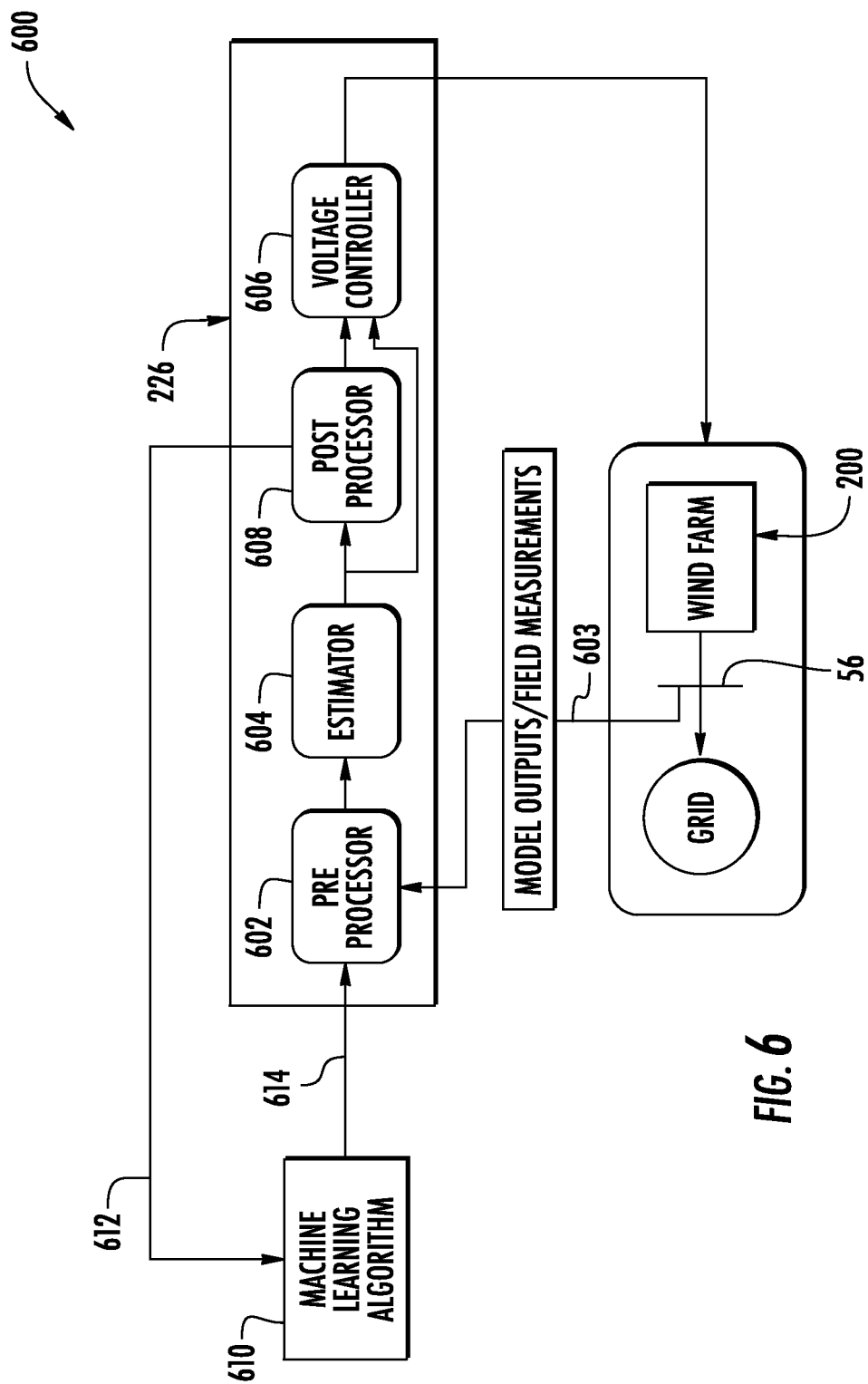
FIG. 6 illustrates a schematic diagram of one embodiment of a system for controlling a wind farm electrical power system according to the present disclosure.

Referring now to FIGS. 5 and 6, a method 500 and system 600 for controlling a wind farm electrical power system according to the present disclosure are illustrated, respectively. More specifically, FIG. 5 illustrates a flow chart of one embodiment of a method 500 for controlling a wind farm electrical power system according to the present disclosure, whereas FIG. 6 illustrates a schematic diagram of one embodiment of a system 600 for controlling a wind farm electrical power system according to the present disclosure.

In general, the method 500 and system 600 will be described herein with reference to the wind turbine 10, the wind turbine power system 100, the wind farm electrical power system 200, and the various controllers illustrated in FIGS. 1-4. However, it should be appreciated that the disclosed method 500 and system 600 may be implemented with wind turbines and wind farms having any other suitable configurations.

In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure. Moreover, it should be understood that the method 500 can be performed by one or more controllers, such as central master controller 226 and/or turbine-level controller 224, and by the other devices included with a wind turbine power system 100 and/or wind farm electrical power system 200.

Referring particularly to FIG. 5, as shown at (502), the method 500 includes receiving, e.g. via the master controller 226, one or more electrical signals associated with the point of interconnection 56 for a frequency domain. For example, in an embodiment, as shown in FIG. 6, a preprocessor 602 of the controller 226 may receive the electrical signal(s) 603 from the point of interconnection 56. Moreover, in an embodiment, the electrical signal(s) may include any one of or a combination of the following: phase voltage, phase current, active power, and/or reactive power at the point of interconnection 56. In addition, in certain embodiments, the method 500 may include measuring the electrical signal(s) via at least one sensor, such as one of sensors 410, 412, 414. Alternatively, the method 500 may include determining or estimating the electrical signal(s) via a computer-implemented model of the controller 226.

As shown at (504), the method 500 includes estimating, via an estimator 604 of the controller 226, a voltage sensitivity (e.g. a grid strength) of the electrical grid using the electrical signal(s). In further embodiments, the method 500 may include processing the electrical signal(s) associated with the point of interconnection 56 prior to estimating the voltage sensitivity. For example, as shown in FIG. 6, the preprocessor 602 may be capable of filtering, sorting, or similar or combinations thereof the electrical signal(s).

Figure 7:
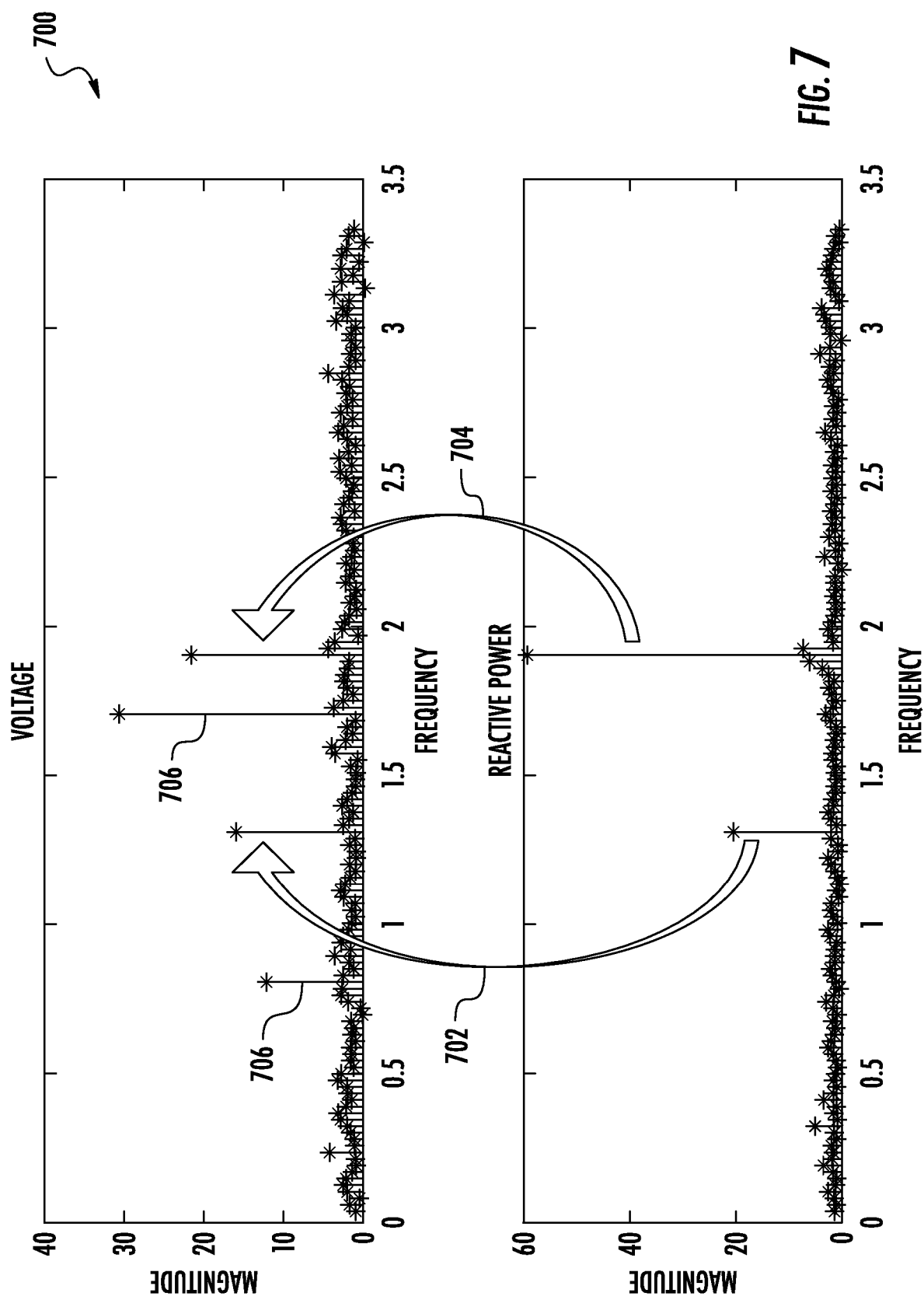
FIG. 7 illustrates a graph of one embodiment of frequency domains for voltage and reactive power according to example embodiments of the present disclosure.
Figure 8:
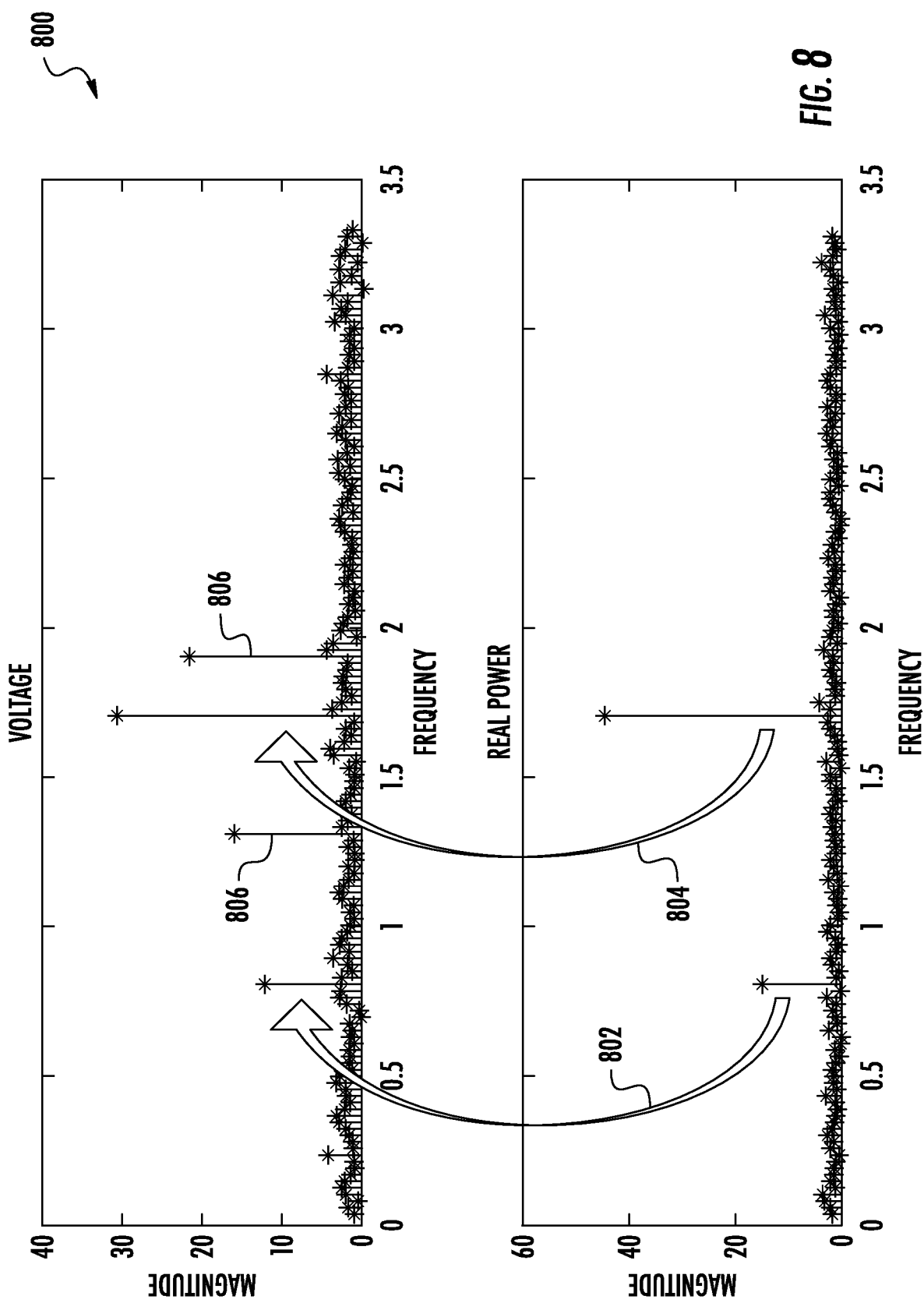
FIG. 8 illustrates a graph of one embodiment frequency domains for voltage and active power according to example embodiments of the present disclosure.

In particular embodiments, the controller 226 is configured to estimate the voltage sensitivity of the electrical grid by modeling the electrical grid as a linear time-invariant system for the frequency domain (e.g. having short measurement windows and small, linear signal disturbances). For example, as shown in FIGS. 7 and 8, the controller 226 may be configured to generate frequency domains 700, 800 for the electrical signal(s). More particularly, as shown, FIG. 7 illustrates frequency domains for voltage and reactive power, whereas FIG. 8 illustrates frequency domains for voltage and active power. Since the wind farm electrical power system 200 will have perturbations in active power due to wind speed variations and frequencies of perturbations exist in active and reactive power for individual wind farms, the controller 226 can easily monitor the frequency domain for perturbations. More specifically, a perturbation in active or reactive power at a particular frequency translates to a voltage response at the same frequency.

Thus, as shown in FIG. 7, the controller 226 is configured to identify corresponding response pairs of voltage and reactive power (as indicated via arrows 702, 704). Similarly, as shown in FIG. 8, the controller 226 is configured to identify corresponding response pairs of voltage and active power (as indicated via arrows 802, 804). In other words, the controller 226 is configured to group perturbations of active power and/or reactive power with the phase voltage for the frequency domain. Thus, the controller 226 can determine whether the perturbations correspond to the wind farm electrical power system 200 or to neighboring wind farm electrical power systems. For example, in an embodiment, the controller 226 may identify perturbations that are not in groups or pairs as those corresponding to perturbations from neighboring wind farm electrical power systems. Accordingly, the controller 226 can remove perturbations (such as perturbations 706, 806) corresponding to neighboring wind farm electrical power systems to decouple an effect of the perturbations 706, 806 on the voltage sensitivity.

Referring back to FIG. 6, the system 600 may also include a post processor 608 for processing the electrical signal(s) associated with the point of interconnection 56 after estimating the voltage sensitivity of the electrical grid e.g. to determine an error analysis of the parameter(s) of the voltage regulator(s) 228.

Accordingly, as shown in FIG. 5 at (506), the method 500 includes dynamically controlling a voltage of the wind farm electrical power system 200 at the point of interconnection 56 based on the voltage sensitivity. For example, in an embodiment, as shown in FIG. 6, the controller 226 may include a voltage controller 606 configured to dynamically control the voltage of the wind farm electrical power system 200 by varying at least one parameter of one or more of the voltage regulators 228 of the individual wind turbine power systems 100 of the wind farm 200 to avoid instability of the electrical grid. In particular embodiments, for example, the parameter(s) may include, for example, a regulator gain, an active power set point, a reactive power set point, or combinations thereof, as well as any other suitable parameter.

Figure 9:
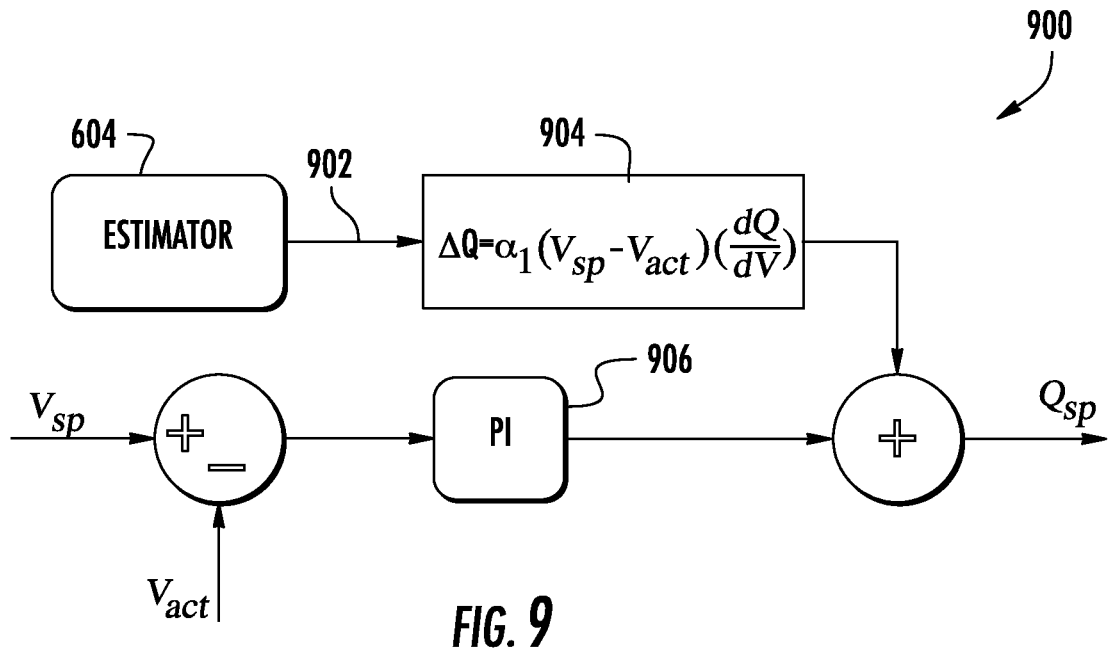
FIG. 9 illustrates a schematic control diagram of one embodiment of the estimator of the system for controlling a wind farm electrical power system according to the present disclosure.
Figure 10:
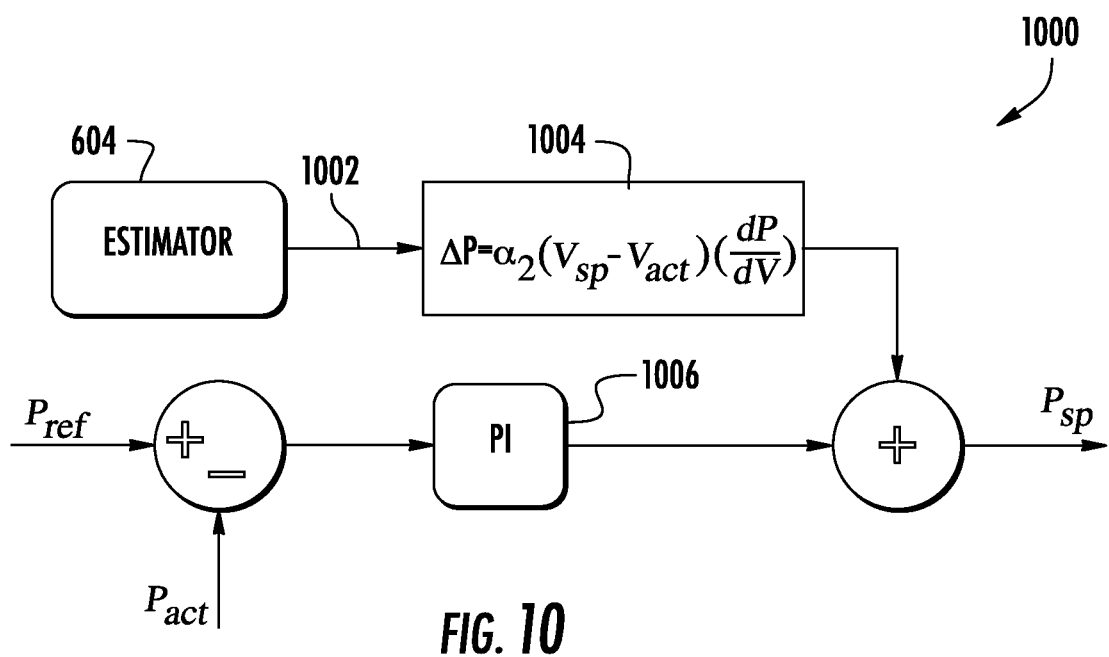
FIG. 10 illustrates a schematic control diagram of another embodiment of the estimator of the system for controlling a wind farm electrical power system according to the present disclosure.

Referring now to FIGS. 9 and 10, control diagrams 900, 1000 of various embodiments for varying the reactive power and active power set points ($Q_{SP}$ and $P_{SP}$), respectively, of one or more of the voltage regulators 228 of the individual wind turbine power systems 100 of the wind farm 200 to avoid instability of the electrical grid are illustrated. Furthermore, as shown in FIGS. 9 and 10, the control diagrams 900, 1000 may include proportional integral (PI) controllers 906, 1006. As such, the control schemes 900, 100 may be capable of dynamically tuning the regulator gains associated with the PI controllers 906, 1006. More particularly, as shown, the control diagrams illustrate implementation of feedforward voltage control based on outputs 902, 1002 of the estimator 604. Thus, as shown at blocks 904 and 1004, respectively, $\Delta Q$ and $\Delta P$ may be calculated as a function of the voltage sensitivities (e.g. dQ/dV, dP/dV) from the estimator 604. More specifically, as shown at block 904 in FIG. 9, $\Delta Q$ may be calculated as a function of, at least, a gain ($\alpha_1$) that can be tuned to a particular wind farm, the voltage setpoint ($V_{sp}$), the actual voltage ($V_{act}$), and the voltage sensitivity (dQ/dV) from the estimator 604. Similarly, as shown at block 1004 in FIG. 10, $\Delta P$ may be calculated as a function of, at least, a gain ($\alpha_2$) that can be tuned to a particular wind farm, the voltage setpoint ($V_{sp}$), the actual voltage ($V_{act}$), and the voltage sensitivity (dP/dV) from the estimator 604. Moreover, it should be understood that $\alpha_1$ and $\alpha_2$ can be dynamically altered by a machine learning algorithm in the closed loop runs, depending on the post processor error analysis.

Thus, in certain embodiments, the controller 226 is configured to distribute the adjusted set points for active and reactive power ($Q_{SP}$ and $P_{SP}$) to achieve the desired voltage response. As such, the wind farms response can be recorded to process the data and provide the feedback to a machine learning-based algorithm to take further decisions. For example, as shown in FIG. 6, the system 600 may include a machine learning algorithm 610 that receives feedback 612 from the post processor 608 and trains the feedback 612. In such embodiments, as shown, the machine learning algorithm 610 is configured to generate one or more control commands 614 for the estimator 604 of the controller 226 to continually update the estimator 604.

For example, in an embodiment, the control command(s) 614 may include the gains $\alpha_1$ and $\alpha_2$ used for clustering/grouping the frequency domain signals of the electrical signals measured as well as the thresholds set to filter out the unwanted frequency domain signals to be grouped. Moreover, the control command(s) 614 may include some adjustments to the pre-processor parameters such as the sampling window for the analysis, the number of samples considered at a time for estimation, etc. In other words, the machine learning algorithm 610 is configured to adjust any parameters described herein so as to reduce the error computed by the post processor (the error being the difference between the actual voltage measured and the voltage estimated using the voltage sensitivities). As such, a goal of the machine learning algorithm 610 is to make the system 600 adaptable and robust in case of weak grid situations.

In particular embodiments, the response time of the estimator 604 may be faster than the controller 226, which is faster than the commands 614 coming from the machine learning algorithm 610. Moreover, in an embodiment, the machine learning algorithm 610 may be a trained neural network, a simple linear regression model, a random forest regression model, a support vector machine, or any suitable type of a supervised learning model based on the quality and quantity of data received. More specifically, in an embodiment, the method may include embedding a reinforcement learning technique in the machine learning algorithm 610.

Various aspects and embodiments of the present invention are defined by the following numbered clauses:

Clause 1. A method for controlling a wind farm electrical power system, wherein the wind farm electrical power system includes a controller, a plurality of wind turbines electrically connected to an electrical grid through a point of interconnection, and wherein each wind turbine includes a voltage regulator, the method comprising:

receiving, via the controller, one or more electrical signals associated with the point of interconnection for a frequency domain;

estimating, via an estimator of the controller, a voltage sensitivity of the electrical grid using the one or more electrical signals; and, dynamically controlling a voltage of the wind farm electrical power system at the point of interconnection based on the voltage sensitivity.

Clause 2. The method of clause 1, wherein the one or more electrical signals comprise at least one of phase voltage, phase current, active power, and reactive power at the point of interconnection.

Clause 3. The method of any of the preceding clauses, further comprising at least one of measuring the one or more electrical signals via at least one sensor or determining the one or more electrical signals via a computer-implemented model of the controller.

Clause 4. The method of any of the preceding clauses, further comprising processing the one or more electrical signals associated with the point of interconnection prior to estimating the voltage sensitivity, wherein processing the one or more electrical signals comprises at least one of filtering or sorting.

Clause 5. The method of any of the preceding clauses, wherein estimating the voltage sensitivity of the electrical grid using the one or more electrical signals further comprises:

modeling, via the controller, the electrical grid as a linear time-invariant system for the frequency domain;

monitoring the frequency domain for perturbations;

determining whether the perturbations correspond to the wind farm electrical power system or to neighboring wind farm electrical power systems; and, removing perturbations corresponding to neighboring wind farm electrical power systems to decouple an effect of the perturbations on the voltage sensitivity.

Clause 6. The method of any of the preceding clauses, wherein determining whether the perturbations correspond to the wind farm electrical power system or to neighboring wind farm electrical power systems further comprises:

grouping perturbations of at least one of the active power or the reactive power with the phase voltage for the frequency domain; and, removing perturbations not in groups.

Clause 7. The method of any of the preceding clauses, wherein dynamically controlling the voltage of the wind farm electrical power system based on the voltage sensitivity further comprises:

varying at least one parameter of one or more of the voltage regulators to avoid instability of the electrical grid.

Clause 8. The method of any of the preceding clauses, wherein the at least one parameter comprises at least one of a regulator gain, an active power set point, or a reactive power set point.

Clause 9. The method of any of the preceding clauses, further comprising processing, via a post processor of the controller, the one or more electrical signals associated with the point of interconnection after dynamically controlling the voltage of the wind farm electrical power system based on the voltage sensitivity to determine an error analysis of the one or more parameters of the voltage regulator.

Clause 10. The method of any of the preceding clauses, further comprising:

receiving, via a machine learning algorithm of the controller, feedback from the post processor; and, training the feedback via the machine learning algorithm.

Clause 11. The method of any of the preceding clauses, further comprising generating one or more control commands for the estimator of the controller using outputs of the machine learning algorithm to continually update the estimator.

Clause 12. The method of any of the preceding clauses, wherein a response time of the estimator is faster than the controller and a response time of the controller is faster than generation of the one or more control commands from the machine learning algorithm.

Clause 13. The method of any of the preceding clauses, wherein the machine learning algorithm comprises a trained neural network, a simple linear regression model, a random forest regression model, or a support vector machine.

Clause 14. The method of any of the preceding clauses, further comprising embedding a reinforcement learning technique in the machine learning algorithm.

Clause 15. A system for controlling a wind farm electrical power system, wherein the wind farm electrical power system includes a plurality of wind turbines electrically connected to an electrical grid through a point of interconnection, and wherein each wind turbine includes a voltage regulator, the system comprising:

a controller comprising a plurality of processors, the plurality of processors comprising, at least, an estimator, the estimator configured to perform operations, the operations comprising:

receiving one or more electrical signals associated with the point of interconnection for a frequency domain; and, estimating a voltage sensitivity of the electrical grid using the one or more electrical signals; and, wherein the controller dynamically controls a voltage of the wind farm electrical power system at the point of interconnection based on the voltage sensitivity by varying at least one parameter of one or more of the voltage regulators to avoid instability of the electrical grid.

Clause 16. The system of clause 15, wherein the one or more electrical signals comprise at least one of phase voltage, phase current, active power, and reactive power at the point of interconnection.

Clause 17. The system of clauses 15-16, wherein the plurality of processors further comprises a pre-processor for processing the one or more electrical signals associated with the point of interconnection prior to estimating the voltage sensitivity.

Clause 18. The system of clauses 15-17, wherein estimating the voltage sensitivity of the electrical grid using the one or more electrical signals further comprises:

modeling the electrical grid as a linear time-invariant system for the frequency domain;

monitoring the frequency domain for perturbations;

determining whether the perturbations correspond to the wind farm electrical power system or to neighboring wind farm electrical power systems; and, removing perturbations corresponding to neighboring wind farm electrical power systems to decouple an effect of the perturbations on the voltage sensitivity.

Clause 19. The system of clauses 15-18, wherein the plurality of processors further comprises a post-processor for processing the one or more electrical signals associated with the point of interconnection after dynamically controlling the voltage of the wind farm electrical power system based on the voltage sensitivity to determine an error analysis of the one or more parameters of the voltage regulator.

Clause 20. The system of clauses 15-19, wherein the plurality of processors further comprises a machine learning algorithm configured to receive and train feedback from the post processor and generate one or more control commands for the estimator to continually update the estimator.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a wind farm electrical power system electrically connected to an electrical grid through a point of interconnection, wherein the wind farm electrical system is located in a remote location, the wind farm electrical power system including a controller, and a plurality of wind turbines, each of the plurality of wind turbines including a voltage regulator, the method comprising:

receiving, via the controller, a plurality of electrical signals associated with the point of interconnection for a frequency domain, the plurality of electrical signals comprising one of phase voltage or phase current and a power signal;

estimating, via an estimator of the controller, a voltage sensitivity of the electrical grid using the plurality of electrical signals by modeling the electrical grid as a linear time-invariant system for the frequency domain having short measurement windows and a plurality of linear signal disturbances;

identifying corresponding response pairs of linear signal disturbances in the plurality of linear signal disturbances of one of the phase voltage or the phase current and the power signal having a magnitude greater than magnitudes of remaining response pairs;

removing linear signal disturbances in the plurality of linear signal disturbances not identified as the corresponding response pairs so as to decouple an effect of neighboring wind farm electrical power systems on the voltage sensitivity; and dynamically controlling a voltage of the wind farm electrical power system at the point of interconnection based on the voltage sensitivity.

2. The method of claim 1, wherein the at least one power signal comprises at least one of active power and reactive power at the point of interconnection.

3. The method of claim 1, further comprising at least one of measuring the plurality of electrical signals via at least one sensor or determining the plurality of electrical signals via a computer-implemented model of the controller.

4. The method of claim 1, further comprising processing the plurality of electrical signals associated with the point of interconnection prior to estimating the voltage sensitivity, wherein processing the plurality of electrical signals comprises at least one of filtering or sorting.

5. The method of claim 1, wherein dynamically controlling the voltage of the wind farm electrical power system based on the voltage sensitivity further comprises:

varying at least one parameter of one or more of the voltage regulators to avoid instability of the electrical grid.

6. The method of claim 5, wherein the at least one parameter comprises at least one of a regulator gain, an active power set point, or a reactive power set point.

7. The method of claim 5, further comprising processing, via a post processor of the controller, the plurality of one or more electrical signals associated with the point of interconnection after dynamically controlling the voltage of the wind farm electrical power system based on the voltage sensitivity to determine an error analysis of the one or more parameters of the voltage regulator.

8. The method of claim 7, further comprising:

receiving, via a machine learning algorithm of the controller, feedback from the post processor; and, training the feedback via the machine learning algorithm.

9. The method of claim 8, further comprising generating one or more control commands for the estimator of the controller using outputs of the machine learning algorithm to continually update the estimator.

10. The method of claim 9, wherein a response time of the estimator is faster than generation of the one or more control commands from the machine learning algorithm.

11. The method of claim 8, wherein the machine learning algorithm comprises a trained neural network, a simple linear regression model, a random forest regression model, or a support vector machine.

12. The method of claim 8, further comprising embedding a grid reinforcement learning technique for learning grid strength of the electrical grid in the machine learning algorithm.

13. A system for controlling a wind farm electrical power system connected to an electrical grid through a point of interconnection, wherein the wind farm electrical system is located in a remote location, the wind farm electrical power system including a plurality of wind turbines, each of the plurality of wind turbines including a voltage regulator, the system comprising:
   a controller comprising a plurality of processors, the plurality of processors comprising, at least, an estimator, the estimator configured to perform operations, the operations comprising:
      receiving a plurality of electrical signals associated with the point of interconnection for a frequency domain, the plurality of electrical signals comprising one of phase voltage or phase current and a power signal; and,
      estimating a voltage sensitivity of the electrical grid using the plurality of electrical signals by modeling the electrical grid as a linear time-invariant system for the frequency domain having short measurement windows and a plurality of linear signal disturbances;
      identifying corresponding response pairs of linear signal disturbances in the plurality of linear signal disturbances of one of the phase voltage or the phase current and the power signal having a magnitude greater than magnitudes of remaining response pairs;
      removing linear signal disturbances in the plurality of linear signal disturbances not identified as the corresponding response pairs so as to decouple an effect of neighboring wind farm electrical power systems on the voltage sensitivity; and
   wherein the controller dynamically controls a voltage of the wind farm electrical power system at the point of interconnection based on the voltage sensitivity by varying at least one parameter of one or more of the voltage regulators to avoid instability of the electrical grid.

14. The system of claim 13, wherein the at least one power signal comprises at least one of active power, and reactive power at the point of interconnection.

15. The system of claim 13, wherein the plurality of processors further comprises a pre-processor for processing the plurality of electrical signals associated with the point of interconnection prior to estimating the voltage sensitivity.

16. The system of claim 13, wherein the plurality of processors further comprises a post-processor for processing the plurality of electrical signals associated with the point of interconnection after dynamically controlling the voltage of the wind farm electrical power system based on the voltage sensitivity to determine an error analysis of the one or more parameters of the voltage regulator.

17. The system of claim 16, wherein the plurality of processors further comprises a machine learning algorithm configured to receive and train feedback from the post processor and generate one or more control commands for the estimator to continually update the estimator.

* * * * *